Patented July 4, 1944

2,352,670

UNITED STATES PATENT OFFICE 2,352,670

ART OF DRIED STARCH BEARING FOOD

Zelmanas Volpertas, New York, N. Y.

No Drawing. Application January 1, 1942, Serial No. 425,339. In Great Britain October 14, 1937

8 Claims. (Cl. 99—207)

Among the objects of the present invention are the production of farinaceous starch containing vegetable product in dry powder form with the preservation therein unaltered, of all of the various water soluble and other ingredients and the removal only of the water, i. e., substantially all of the free water that is present in the natural product and in its most advantageous application, the invention has as an object the preparation of a dry powder of potatoes from which mashed potatoes or potato puree indistinguishable in character and taste from the conventional properly cooked dish, may be prepared almost instantly by the mere stirring of the powder into hot milk or water or mixtures thereof, bouillon or other potable liquid.

The present application is a continuation in part of my copending applications, Serial No. 234,261, filed October 10, 1938, and Serial No. 254,739, filed February 4, 1939.

As conducive to a clear understanding of the invention, it is noted that in reducing potatoes to powder, concurrent heating and agitation leads to gelatinization of the mass. This entails the mechanical difficulty of adhesion to the drying surfaces. But what is much more serious, the resultant dry powder, when stirred into hot liquid to prepare the mass for consumption, yields a product that lacks the properties of freshly cooked potatoes. The product is glutinous or pasty and has neither the odor nor the taste of potato puree or mashed potatoes, but is quite unpalatable.

According to the present invention, predrying is resorted to under heat and without agitation to reduce the water content of the potatoes to extent such as to permit the subsequent drying operation to be performed under heat and vigorous agitation without the danger of the mass becoming gelatinous. Yet sufficient water is present at the stage of reducing the mass to a moist powder after predrying to avoid alteration in the structure of the starch and to avoid the consequent thickening or pastiness of the end product upon the subsequent addition of hot liquid in preparing the dish for consumption. At the commencement of that later stage of drying where in addition to some heat, vigorous agitation is required for further removal of water from the moist powder, too little water remains to promote gelatinization of the starch.

In a specific method for the preparation of potato powder, the potatoes are washed, peeled and cut into pieces, which may be approximately a cubic inch or less in size and they are then cooked. The cooking is performed in a double walled vessel, desirably in the absence of water. Desirably, the heat is generated by circulation of boiling water through the hollow jacket of the vessel and no pressure being built up in the jacket, the temperature of the contents will be maintained substantially at 100 degrees C. The vessel is desirably pre-heated before the potato pieces are introduced therein, so that the water vapor promptly passing off the potatoes in the heating will afford an environment substantially excluding oxygen, and the blackening of the peeled potatoes incurred in some cases by contact with the air is avoided.

During about a half of the cooking process, the vessel is substantially closed, so as to develop slight steam pressure to thoroughly penetrate the potatoes. Thereupon, the vessel is opened slightly, or it is permitted to open under pressure, for more direct communication with the surrounding air, and escape of water vapor from the potatoes. During the cooking operation, the potatoes may be stirred ever so slightly, to assure more uniformity of heat application thereto.

It will be noted that the potatoes lose water in the operation set forth, as distinguished from the gain of water incurred in cooking by conventional processes. What is more important, the potatoes do not lose valuable water-soluble ingredients, such as sugars, salts and albumens which are commonly leached out when cooking in water.

The potato pieces are now pre-dried preparatory to subdividing them into a moist powder. This pre-drying operation is carried on until the potato mass has been reduced to about one-half its initial weight by loss of water. In this pre-drying operation it is important to avoid excessive agitation or pressure upon the potatoes. Subject to this precaution the pre-drying may be conducted under controlled heat preferably, though not necessarily, with the application of vacuum.

Where vacuum pre-drying is resorted to this may be carried on in the same cylinder in which the cooking is done. For this purpose the cylinder is hermetically sealed, the further application of heat is discontinued and the vacuum is applied while the potato pieces are stirred gently from time to time. In this manner, a substantial quantity of water is withdrawn from the potatoes while they are cooling. By the time the potatoes have cooled down to 35 to 40 degrees C. they will have lost approximately 20 to 30 per cent of their weight.

At this stage, cool water may be passed through the hollow jacket of the cylinder to bring the potatoes down to a still lower temperature of about 20 degrees C., and a higher vacuum is applied so as to reduce the weight of the potatoes by approximately a further 25 per cent of the weight of the untreated potatoes. It is important that the potatoes be cooled to the temperature noted before such higher vacuum is applied, and that the stirring be very gentle, as otherwise the mass has a tendency to become pasty or glutinous and to be rendered unfit for the desired purpose.

Alternatively the cooked potato pieces may be predried without vacuum, preparatory to reducing the same to the moist powder. In such operation, they are desirably laid in a suitable dryer through which is passed a current of air, not necessarily completely dried air, which is heated to desirably about 50 degrees C. During such pre-drying operation, the potatoes are frequently or constantly moved, but not subjected to mechanical pressure. After this pre-drying treatment cooling may be effected in the same dryer by passing cool instead of warm air therethrough.

The step following the pre-drying above set forth, whether performed with or without vacuum is mechanically to convert the mass into a moist powder. Before this is done, it is desirable to cool the same down further as by exposure to the open air, if the climate is sufficiently cold, or by pre-chilled air. At a temperature preferably not higher than ten degrees C. the mass may be subjected to mechanical pressure to convert it to a light moist powder without rendering it pasty. The mechanical comminution may be effected desirably by passing the potato pieces through an appropriate mill, as for instance, of the helical rotor type or through a machine similar to those commonly used for almond grinding. In this subdivision by pressure, the structure of the starch ingredient remains unaltered, for the cell walls have been rendered firm in the cooling and this apparently precludes the mass from becoming pasty. There is still so much water present in the mass, however, that the structure of the starch remains unaltered in this mechanical treatment, so that there is no danger of the product losing the properties of freshly made mashed potatoes when hot fluid is subsequently added in preparing the finished powder for consumption. Yet by reason of the fact that about 50 per cent of the water has been removed, there remains too little water for the mass to become glutinous and the resultant moist powder will, therefore, not adhere together. Nor will such glutinous or adhesive property develop in the subsequent heating and vigorous agitation for removing further water from the moist powder.

The moist powder is now subjected to the final drying operation, desirably in the same cylinder used in the pre-drying. This operation is desirably conducted under moderate heat, desirably at about 30 degrees C., under vacuum and with vigorous stirring, in which operation water passes off quite rapidly from the moist powder preferably until the powder has only about 12 to 15 per cent of water content.

The powder prior to the final drying noted is fairly bulky, its specific gravity being only 0.5 to 0.6. In the rapid loss of water in this final drying process, the volume of the powder shrinks rapidly. Where initially the cylinder is 25 to 30 per cent filled with the moist powder, the content shrinks down to less than 10 per cent. The last 5 to 10 per cent moisture evaporate much more slowly. Accordingly, it is feasible and desirable to collect the contents of several cylinders into one cylinder and to heat the latter say to 30 degrees C., and to apply strong vacuum, further to reduce the water content down to 6 to 10 per cent. That 6 to 10 per cent of water is apparently substantially water of constitution and any attempt to remove it would be useless. For, at that stage the powder is hygroscopic and absorbs moisture rapidly from the air to reach a moisture content of about 10 per cent.

It is desirable throughout to keep the temperature moderate as noted, as higher temperature, especially in the drying of the moist powder results in a dark product.

If the process is carried on in the ideal manner, there should be no coarse particles in the potato powder. However, in practice, if the pre-drying should not be carefully performed, that is, if the agitation in the drying of the moist powder is not as vigorous as it should be, or if the pre-drying is excessive, a considerable proportion of coarser grains may result.

By reason of their low water content, these coarser grains must not be ground, as grinding would alter the structure of the starch, so that the addition of hot liquid in preparing the dish for consumption would result in an unpalatable pasty mass.

The powder is, therefore, preferably passed through a sieve of about 45 mesh so as to separate such coarser particles and to allow only the fine particles to pass through.

The coarser grains may be reclaimed by softening them again. This is preferably done by mixing them with the cooked potato pieces. The coarser grains are preferably mixed in the proportion of one part thereof to from one to two parts of the cooked potato pieces. After mixture of the cooked potatoes (which are preferably first mashed), with the coarse dry grains, the mass is pressed together and left undisturbed for some time in a cool environment to permit moisture from the moist pieces to penetrate the relatively drier coarser particles. The process is continued as heretofore described for the final drying of the moist powder, the coarser grains becoming reduced to the desired powder.

In commercial practice, the result set forth in the previous paragraph may be attained in continuous operation, by introducing the cooked potatoes, preferably in mashed condition, into the cylinder in which the final drying is effected. That is, as part of the dried potato powder is withdrawn from the vacuum cylinder, a larger volume of such moist potato mash is added thereto. By reason of the avidity of the dried powder in the vacuum cylinder for moisture, the latter spreads promptly from the moist mash throughout the dried potato mass, so that the water content of the entire mixture is about 50 per cent and the vigorous agitation and heat applied in the continued drying process as above set forth, will not render the potato mass gelatinous. In a specific illustrative example, assuming that the vacuum drying cylinder has 100 pounds of dried potato powder therein, with but 10 per cent water content, 100 pounds of the moist potato mash with say 70 per cent of water content could be added thereto after the withdrawal of 25 pounds of the dried potato powder. Thus, of the content of 175 pounds now in the cylinder, 77.5 pounds will be water and the rest solid, so that the water content is only about 45 per cent. That water content, as above noted, is sufficiently low to avoid gelatinization in the vigorous agitation required for further removal of water.

The powder produced by the foregoing process has all of the solid ingredients whether soluble or not, of the original potato, which is altered only in the withdrawal therefrom of substantially all of the water, except such small proportion of water which may be truly said to be water of constitution. The powder has a weight of only 15 to 18 per cent of that of the raw potato, so that its use affords great economy in shipping and storage space.

To prepare mashed potatoes from the powder, it is merely necessary to heat water, milk, or a mixture of water and milk, to near the boiling point in an ordinary pot or pan, to remove the source of heat and gradually to add to one part of the powder about five parts of hot water, milk, or a mixture of both, or bouillon, or other potable liquid, while stirring, until the mass reaches the thick consistency of mashed potatoes, an operation that takes but a minute or so, and the product is ready for consumption. The fact that the powder will take up to five times its weight of fluid in producing thick mashed potatoes, is an indication of the extent to which the water had been withdrawn by the process set forth.

As many changes could be made in the above method, and many apparently widely different embodiments of this invention could be made without departing from the scope of the claims, it is intended that all matter contained in the above description, shall be interpreted as illustrative and not in a limiting sense.

Having thus described my invention, what I claim as new and desire to secure by Letters Patent of the United States is:

1. The process of preparing farinaceous starch containing vegetable material which consists in cooking the same in an environment of steam evolved from the heating of the said material, pre-drying the same in the absence of mechanical pressure thereon, until the moisture content has been reduced to about half the initial weight of the material, cooling the same to a temperature in the order of 10 degrees C., mechanically reducing the same to a moist powder and thereupon continuing the drying under moderate heat, under vacuum, and with vigorous agitation.

2. The process of preparing farinaceous starch containing vegetable material, which consists in cooking the same in an environment of steam evolved from the heating of the said material, applying vacuum while permitting the material to cool, thereby to draw off more water and increasing the vacuum as the material reaches a lower temperature, cooling the material further to a temperature in the order of 10 degrees C., mechanically reducing the same to a moist powder, and thereupon continuing the drying under moderate heat, under vacuum and with vigorous agitation.

3. The process of preparing potatoes in powdered form, which includes all of the constituent elements of the potato other than water and which is capable of being converted into mashed potatoes by the simple addition of hot liquid, which process consists in cooking potato pieces in an environment of steam at a temperature of substantially 100 degrees C., thereupon pre-drying the potato pieces in the absence of mechanical pressure thereon until the initial weight of the potato mass has been reduced by about one-half due to the loss of water, cooling the potato mass to a temperature in the order of 10 degrees C. and mechanically converting the same into a moist powder and finally drying the moist powder under moderate heat and vigorous stirring in vacuo, until the water content of the powdered potatoes is down to about 12 to 15 per cent.

4. The process of preparing potatoes in powdered form, which includes all of the constituent elements of the potato other than water and which is capable of being converted into mashed potatoes by the simple addition of hot liquid, which process consists in cooking potato pieces in an environment of steam at a temperature of substantially 100 degrees C. and thereupon applying vacuum, while permitting the potatoes to cool until approximately 20 to 30 per cent of the original weight has been lost due to the evaporation of water, thereupon substantially cooling the potatoes and applying a higher vacuum for loss of approximately 25 per cent more of the original weight, cooling the potato mass to a temperature in the order of 10 degrees C. and mechanically converting the same into a moist powder and finally drying the moist powder under moderate heat and vigorous stirring in vacuo, until the water content of the powdered potatoes is down to about 12 to 15 per cent.

5. The process of preparing potatoes in powdered form, which includes all of the constituent elements of the potato other than water and which is capable of being converted into mashed potatoes by the simple addition of hot liquid, which consists in withdrawing water from pieces of peeled potato by a sequence of steps including the application of heat at a temperature of 100 degrees C., the application of vacuum while cooling to 35 degrees to 40 degrees C., the cooling to a temperature of about 20 degrees C., the application of a higher vacuum, the mechanical subdivision of the potato pieces into a moist powder with about half the initial weight of the potato mass, the application of further moderate heat under vacuum and vigorous agitation to dry the powder to a water content of about 15 per cent by weight, and the final application of moderate heat and vacuum to reduce the water content down to between 6 and 10 per cent, the separation by means of a sieve, of any coarser grains of potatoes from the resultant fine powder, the admixture of such coarser particles with potatoes in the stage following cooking and the completion of the treatment of the cooked potato with the coarser particles combined therewith.

6. The process of preparing potatoes in powdered form which includes all of the constituent elements of the potato other than water and which is capable of being converted into mashed potatoes by the simple addition of hot liquid thereto, which consists in cooking potato pieces in an environment of steam evolved from the heating of the same, pre-drying the potato pieces in a current of air at about 50 degrees C. and in the absence of mechanical pressure thereon until the weight of the potato mass shall have been reduced to about half of its initial weight, due to the loss of water, thereupon cooling the potato pieces to a temperature in the order of 10 degrees C., mechanically converting the same into a moist powder and finally drying the moist powder under moderate heat and vigorously stirring in vacuo until the water content of the powdered potatoes is down to about 12 to 15 per cent.

7. The process of preparing potatoes in powdered form, which includes all of the constituent elements of the potato other than water and which is capable of being converted into mashed potatoes by the simple addition of hot liquid, which process consists in cooking potato pieces in an environment of steam at a temperature of substantially 100 degrees C., thereupon pre-drying the potato pieces in the absence of mechanical pressure thereon until the initial weight of the potato mass has been reduced by about one-half due to the loss of water, cooling the potato mass, mechanically converting the same into a moist powder, drying the moist powder under moderate heat and stirring in vacuo until the water content of the powdered potatoes is down to about 12 to 15 per cent, collecting the potato powder thus prepared to a substantial bulk and continuing the heating thereof until the water content is reduced to between 6 and 10 per cent.

8. The process of preparing potatoes in powdered form which includes all of the constituent elements of the potato other than water and which is capable of being converted into mashed potatoes by the simple addition of hot liquid, which process consists in cooking potato pieces in an environment of steam at a temperature of substantially 100 degrees C. and thereupon applying vacuum, while permitting the potatoes to cool until approximately 20 to 30 per cent of the original weight has been lost due to the evaporation of water, thereupon substantially cooling the potatoes and applying a higher vacuum for loss of approximately 25 per cent more of the original weight, cooling the potato mass, mechanically converting the same into a moist powder, drying the moist powder under moderate heat and vigorous stirring in vacuo, until the water content of the powdered potatoes is down to about 12 to 15 per cent, and adding further potato mash after withdrawal of part of the substantially completely dried potato powder whereby, the moisture from the added potato mash will promptly spread throughout the dried powder and the said further drying under vigorous stirring takes place in a continuous process without gelatinization of the potato mass.

ZELMANAS VOLPERTAS.